United States Patent [19]

Kim

[11] Patent Number: 4,506,913

[45] Date of Patent: Mar. 26, 1985

[54] MARKET RESEARCH BOOKLET

[75] Inventor: Chang J. Kim, Cincinnati, Ohio

[73] Assignee: Burke Marketing Services, Inc., Cincinnati, Ohio

[21] Appl. No.: 618,915

[22] Filed: Jun. 8, 1984

[51] Int. Cl.[3] .......................... G09F 1/08; G09B 7/00; B42D 15/00; B42D 1/00

[52] U.S. Cl. ........................................ 283/56; 283/51; 281/21 R; 281/23

[58] Field of Search ................ 281/21 R, 23; 283/56, 283/51, 49; 434/363

[56] References Cited

U.S. PATENT DOCUMENTS

| | | | |
|---|---|---|---|
| 1,510,194 | 9/1924 | Radford | 283/56 |
| 1,599,460 | 9/1926 | Craze | 283/56 |
| 1,625,053 | 4/1927 | Requa | 283/56 |
| 2,255,535 | 9/1941 | Sauer | 283/56 |
| 3,275,316 | 9/1966 | Cleary, Jr. | 283/56 X |
| 3,517,947 | 4/1967 | Bennett | 283/56 |

*Primary Examiner*—Paul A. Bell
*Assistant Examiner*—Paul M. Heyrana, Sr.
*Attorney, Agent, or Firm*—Wood, Herron & Evans

[57] ABSTRACT

A product opinion research booklet having the following in sequence: a cover sheet, plural folded pages having their free edges bound to the cover sheet, and a summary sheet. The folded pages have, on the inside, an advertisement on one surface and questions relating to the product advertised on the facing surface. The booklet structure, together with the order of presenting the information, requires the respondent to answer questions in the sequence desired by the party making the opinion research survey.

5 Claims, 3 Drawing Figures

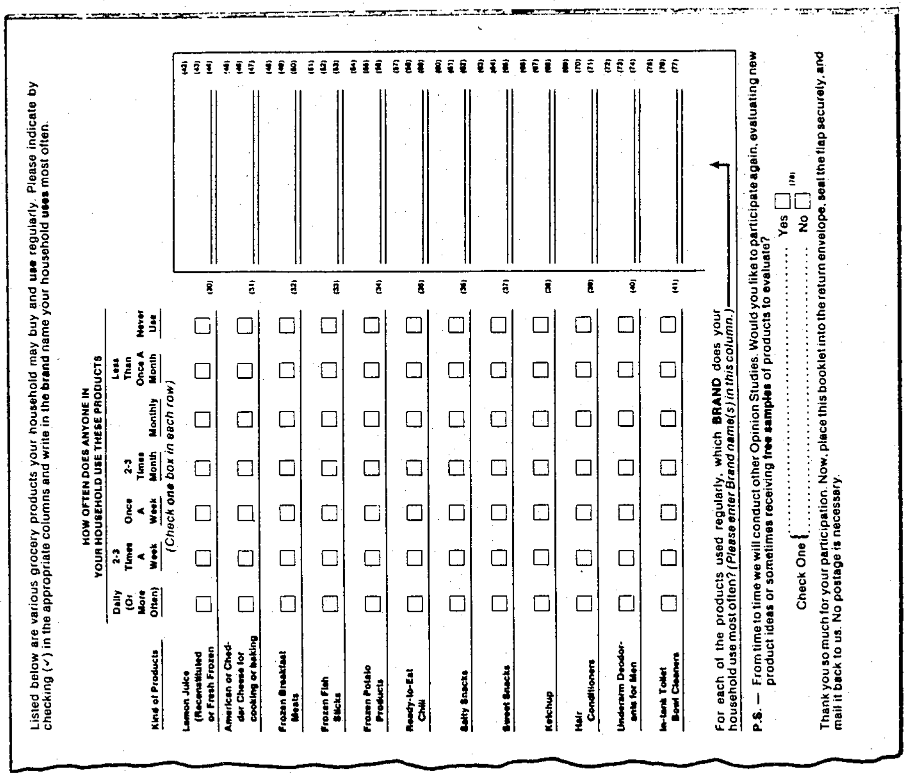

Listed below are various grocery products your household may buy and use regularly. Please indicate by checking (✓) in the appropriate columns and write in the brand name your household uses most often.

| Kind of Products | Daily (Or More Often) | 2-3 Times A Week | Once A Week | 2-3 Times Month | Monthly | Less Than Once A Month | Never Use | | |
|---|---|---|---|---|---|---|---|---|---|
| Lemon Juice (Reconstituted or Fresh Frozen | ☐ | ☐ | ☐ | ☐ | ☐ | ☐ | ☐ | (30) | (42) (43) (44) |
| American or Cheddar Cheese for cooking or baking | ☐ | ☐ | ☐ | ☐ | ☐ | ☐ | ☐ | (31) | (45) (46) (47) |
| Frozen Breakfast Meats | ☐ | ☐ | ☐ | ☐ | ☐ | ☐ | ☐ | (32) | (48) (49) (50) |
| Frozen Fish Sticks | ☐ | ☐ | ☐ | ☐ | ☐ | ☐ | ☐ | (33) | (51) (52) (53) |
| Frozen Potato Products | ☐ | ☐ | ☐ | ☐ | ☐ | ☐ | ☐ | (34) | (54) (55) (56) |
| Ready-to-Eat Chili | ☐ | ☐ | ☐ | ☐ | ☐ | ☐ | ☐ | (35) | (57) (58) (59) |
| Salty Snacks | ☐ | ☐ | ☐ | ☐ | ☐ | ☐ | ☐ | (36) | (60) (61) (62) |
| Sweet Snacks | ☐ | ☐ | ☐ | ☐ | ☐ | ☐ | ☐ | (37) | (63) (64) (65) |
| Ketchup | ☐ | ☐ | ☐ | ☐ | ☐ | ☐ | ☐ | (38) | (66) (67) (68) |
| Hair Conditioners | ☐ | ☐ | ☐ | ☐ | ☐ | ☐ | ☐ | (39) | (69) (70) (71) |
| Underarm Deodorants for Men | ☐ | ☐ | ☐ | ☐ | ☐ | ☐ | ☐ | (40) | (72) (73) (74) |
| In-tank Toilet Bowl Cleaners | ☐ | ☐ | ☐ | ☐ | ☐ | ☐ | ☐ | (41) | (75) (76) (77) |

HOW OFTEN DOES ANYONE IN YOUR HOUSEHOLD USE THESE PRODUCTS (*Check one box in each row*)

For each of the products used regularly, which BRAND does your household use most often? (*Please enter Brand name(s) in this column.*)

P.S. — From time to time we will conduct other Opinion Studies. Would you like to participate again, evaluating new product ideas or sometimes receiving free samples of products to evaluate?

Check One { Yes ☐ No ☐ (78)

Thank you so much for your participation. Now, place this booklet into the return envelope, seal the flap securely, and mail it back to us. No postage is necessary.

12 FIG. 3

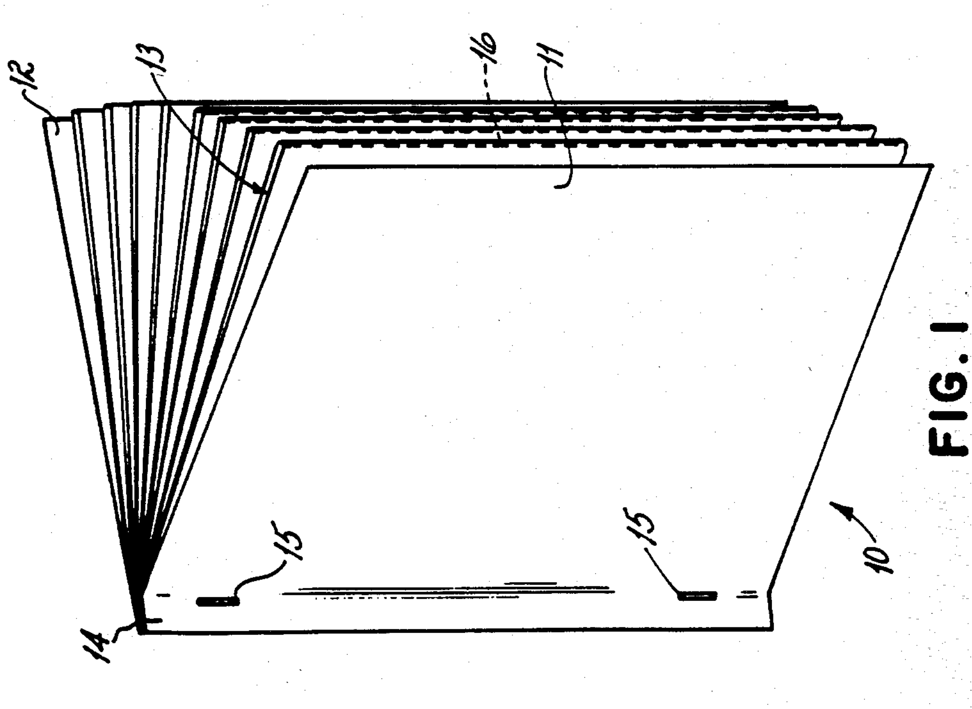

FIG. 1

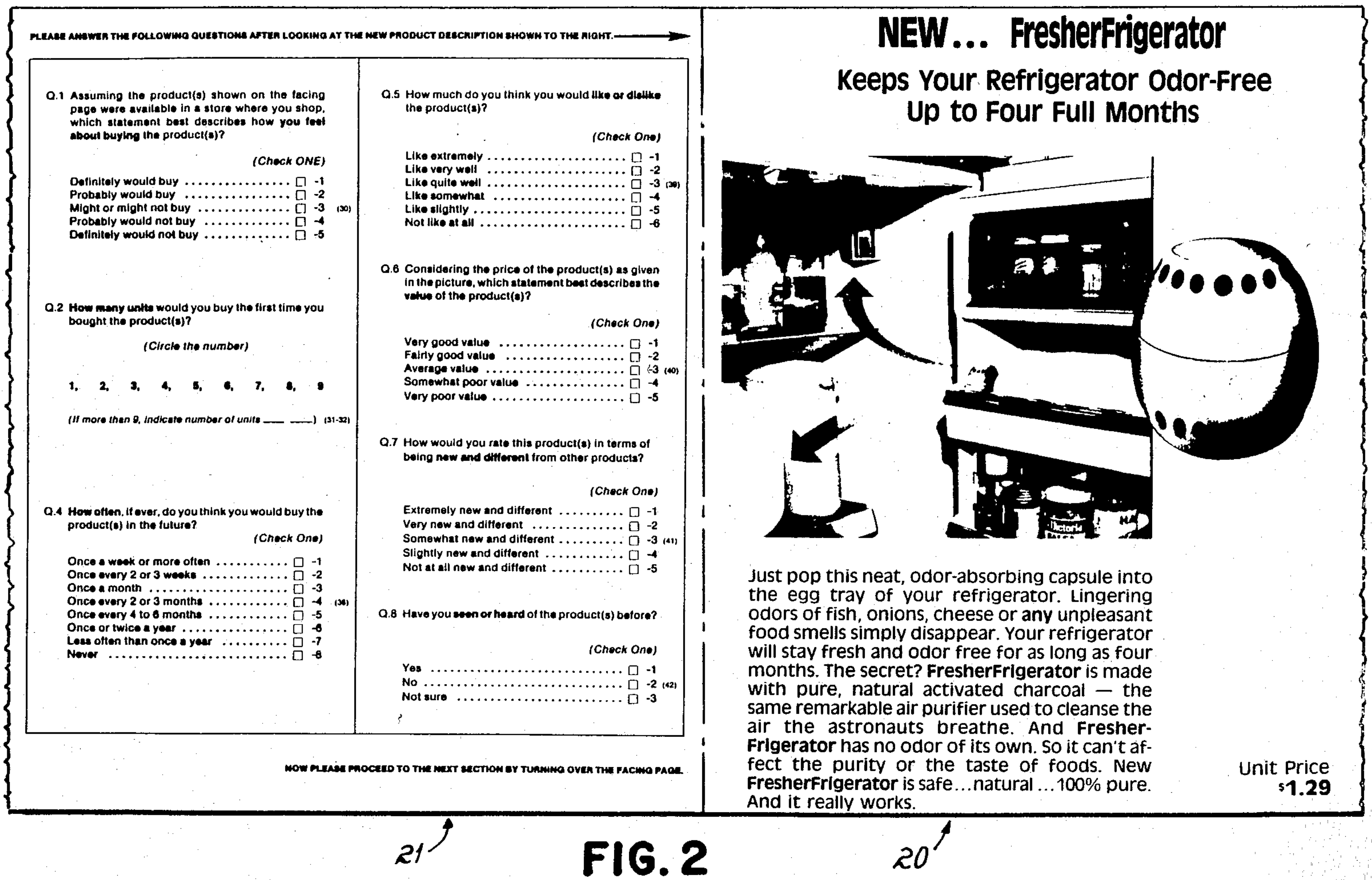

PLEASE ANSWER THE FOLLOWING QUESTIONS AFTER LOOKING AT THE NEW PRODUCT DESCRIPTION SHOWN TO THE RIGHT. →

Q.1 Assuming the product(s) shown on the facing page were available in a store where you shop, which statement best describes how you feel about buying the product(s)?

(Check ONE)

- Definitely would buy ☐ -1
- Probably would buy ☐ -2
- Might or might not buy ☐ -3 (30)
- Probably would not buy ☐ -4
- Definitely would not buy ☐ -5

Q.2 How many units would you buy the first time you bought the product(s)?

(Circle the number)

1, 2, 3, 4, 5, 6, 7, 8, 9

(If more than 9, indicate number of units ____ ____) (31-32)

Q.4 How often, if ever, do you think you would buy the product(s) in the future?

(Check One)

- Once a week or more often ☐ -1
- Once every 2 or 3 weeks ☐ -2
- Once a month ☐ -3
- Once every 2 or 3 months ☐ -4 (36)
- Once every 4 to 6 months ☐ -5
- Once or twice a year ☐ -6
- Less often than once a year ☐ -7
- Never ☐ -8

Q.5 How much do you think you would like or dislike the product(s)?

(Check One)

- Like extremely ☐ -1
- Like very well ☐ -2
- Like quite well ☐ -3 (38)
- Like somewhat ☐ -4
- Like slightly ☐ -5
- Not like at all ☐ -6

Q.6 Considering the price of the product(s) as given in the picture, which statement best describes the value of the product(s)?

(Check One)

- Very good value ☐ -1
- Fairly good value ☐ -2
- Average value ☐ -3 (40)
- Somewhat poor value ☐ -4
- Very poor value ☐ -5

Q.7 How would you rate this product(s) in terms of being new and different from other products?

(Check One)

- Extremely new and different ☐ -1
- Very new and different ☐ -2
- Somewhat new and different ☐ -3 (41)
- Slightly new and different ☐ -4
- Not at all new and different ☐ -5

Q.8 Have you seen or heard of the product(s) before?

(Check One)

- Yes ☐ -1
- No ☐ -2 (42)
- Not sure ☐ -3

NOW PLEASE PROCEED TO THE NEXT SECTION BY TURNING OVER THE FACING PAGE.

FIG. 2

MARKET RESEARCH BOOKLET

This invention relates to a product opinion research booklet.

In the field of market research, it is desired to evaluate the probable impact various products will have in the marketplace. One current mode of making a survey to determine that impact has been what has been referred to as a shopping mall survey. In the actual shopping mall, shoppers are intercepted and asked if they would participate in a survey. The willing respondents are first shown a picture of an advertisement of the product for which a survey is taken. After the respondent has examined the picture, the respondent is asked questions relating to the product in the picture.

This procedure for market research is time-consuming and expensive in requiring the presence of personnel through the entire interrogation.

It has been an objective of the invention to create a survey by mail which will, as closely, as possible, duplicate the results obtained in a shopping mall survey but at a significantly lower cost.

It is a further objective of the invention to provide a mailing piece containing questions which a respondent can answer without the presence of market research personnel.

The foregoing objectives of the invention are achieved by providing a booklet having a plurality of folded pages, for example eight, bound together at their free edges. Each folded page has a picture or proposed advertisement on one surface and instructions on the opposite surface. An instruction page is at the front of the booklet and a summary page is at the end of the booklet.

When the pages are opened up, the picture to be viewed is preferably on the right-hand side and the questions on the left-hand side. This provides some assurance that the first of the two items which the respondent views will be the picture, for that tends to duplicate the situation in the shopping mall survey.

As a further feature of the invention, alternate pictures are dummies or control advertisements, having no significance other than to be used as tools for clearing the respondent's mind of the preceding meaningful advertisement before going on to the next meaningful advertisement. Preferably, the first picture and series of questions are dummies, or meaningless, so as to get the respondent into the rhythm of answering with a mind clear of distractions.

The several objectives and features of the invention will become more readily apparent from the following detailed description taken in conjunction with the accompanying drawings in which:

FIG. 1 is a perspective view of the booklet;

FIG. 2 is a plan view of the folded sheets after the perforated edge is severed and the sheets are opened for inspection; and FIG. 3 is a sample summary sheet at the end of the booklet.

Referring to FIG. 1, the booklet is shown at 10. It includes an instruction sheet 11 at the front, a summary sheet 12 at the back and a plurality of folded sheets 13 between the instruction sheet 11 and the summary sheet 12. The folded sheets are bound to the instruction and summary sheets at the free edges 14 of the folded sheets as by staples 15. The folded sheets preferably have fold lines 16 which are perforated so as to be easily severed without tearing any of the descriptive subject matter or questions in the facing surfaces of the folded sheets.

As shown in FIG. 2, after the perforation lines are severed and the sheets folded flat, the folded sheets have a picture on the right-hand side or surface 20. The opposed surface 21 has a series of questions, a representative sample being set forth in FIG. 2.

The summary sheet 12 also has a series of questions which are set out by way of example in FIG. 3.

The instruction sheet has on one side a message of thanks and the like from the market research company. On the inside of the instruction sheet are the instructions set out in a series of steps. On that sheet the respondent is requested to insert a letter opener between the *first* fold and gently tear along the perforated edges on the right side. The respondents are instructed to look at the new product and complete the questions printed on the left side of the picture. They are further instructed to complete the questionnaire before going on to the next picture.

The process is to be continued until the final questionnaire on the summary sheet or back cover is filled out.

Thereafter, the respondent is requested to return the booklet within five days after it has been received.

In the operation of the invention, the respondent is first called to see if he or she will consent to participating in the survey. If consent is given, the booklet, along with a return envelope, is sent to the respondent.

The respondent follows the instructions. In the first folded sheet, the respondent will usually find a dummy product (the respondent does not know it is a dummy product). The respondent views the product and then answers the questions set forth with respect to it. Having completed the first set of questions, and thereby gotten into the rhythm of participation in the survey with a mind cleared of earlier distractions, the respondent tears open the second folded sheet along the perforation lines. There, the respondent finds a new, totally different product on the right-hand side and questions identical to the first set of questions on the left-hand side of the open sheets. The respondent proceeds to answer the second set of questions.

The respondent opens the third folded sheet by tearing along the perforated edge. Preferably, the respondent sees a dummy picture and a set of questions identical to the first and second set. (It is preferred that the questions associated with each product be identical). The dummy product and questions associated therewith are provided so as to assure the clearing of the respondent's mind of the prior *meaningful* product before going to the next meaningful product.

On completing the second set of dummy questions, the respondent proceeds to the next folded page which now has a meaningful product and an identical set of questions associated with it.

The respondent continues through, for example, eight folded pages. The respondent then answers the questions on the summary sheet which is the back cover page and the survey is completed.

The respondent then returns the booklet to the market research company in an envelope provided for that purpose.

Having decribed my invention, I claim:

1. An opinion research booklet comprising, a cover page, a plurality of folded pages, said folded pages being perforated along the folded edge for ease of tearing, means binding together said cover page and said folded sheets at their free edges, each said folded sheet having inwardly-facing surfaces, said surfaces having an advertisement on one side thereof and a series of questions relating to the advertisement on the other side thereof, each folded sheet having a different advertisement, said cover page containing instructions requiring the sequential tearing of the folded sheets and the responding to questions in sequence, whereby respondents using the booket will avoid having responses tainted by viewing advertisements out of the prescribed order.

2. An opinion research booklet comprising, a cover page, a plurality of folded pages, said folded pages being perforated along the folded edge for ease of tearing, and a summary sheet, means binding together said cover page, said folded sheets at their free edges and said summary sheet, each said folded sheet having inwardly-facing surfaces, said surfaces having an advertisement on one side thereof and a series of questions relating to the advertisement on the other side thereof, said cover page containing instructions requiring the sequential tearing of the folded sheets and the responding to questions in sequence, whereby respondents using the booklet will avoid having responses tainted by viewing advertisements out of the prescribed order.

3. A booklet as in claim 2, wherein, said advertisements in the sequence alternate between meaningful and control advertisements whereby the respondent is subjected to a mind-clearing experience in responding to control questions between meaningful questions, thereby minimizing any influencing interrelationship between meaningful advertisements.

4. A booklet as in claim 2 in which said summary sheet contains a series of summarizing questions relating to the products reviewed in the folded pages.

5. A booklet as in claim 2 wherein the questions on respective folded sheets are substantially identical.

* * * * *